United States Patent [19]
Leichel et al.

[11] Patent Number: 5,487,285
[45] Date of Patent: Jan. 30, 1996

[54] LOCK WITH ROD-SHAPED ELEMENTS

[75] Inventors: René Leichel, Bovenkarspel; Johannes E. Leichel, Purmerend, both of Netherlands

[73] Assignees: Rene Leichel, Bovenkarspel; Pieter Kwakernaat, Enkhuizen, both of Netherlands

[21] Appl. No.: 338,637

[22] PCT Filed: May 25, 1993

[86] PCT No.: PCT/NL93/00105

§ 371 Date: Nov. 22, 1994

§ 102(e) Date: Nov. 22, 1994

[87] PCT Pub. No.: WO93/24724

PCT Pub. Date: Dec. 9, 1993

[30] Foreign Application Priority Data

May 26, 1992 [NL] Netherlands .............................. 9200925
Jan. 22, 1993 [NL] Netherlands .............................. 9300129

[51] Int. Cl.⁶ .................................................. E05B 71/00
[52] U.S. Cl. ........................ 70/18; 70/49; 70/53; 70/233; 70/389
[58] Field of Search ................................ 70/233, 389, 18, 70/53, 30, 49, 58, 260; 59/86; 114/114

[56] References Cited

U.S. PATENT DOCUMENTS

| | | | |
|---|---|---|---|
| 177,814 | 5/1876 | Delkescamp | 70/18 |
| 598,656 | 2/1898 | Colton | 70/53 |
| 1,477,777 | 12/1923 | Shek | 70/53 |
| 1,728,902 | 9/1929 | Cohen | 70/53 |
| 3,747,376 | 7/1973 | White, Jr. | 70/233 X |
| 3,748,876 | 7/1973 | Mathews | 70/18 |
| 3,908,414 | 9/1975 | Thorne | 70/18 |
| 3,933,015 | 1/1976 | Balicki | 70/18 X |
| 3,959,995 | 6/1976 | Fletcher | 70/18 |
| 4,768,358 | 9/1988 | Viola et al. | 70/58 X |
| 5,018,374 | 5/1991 | Montano | 70/233 |

*Primary Examiner*—Lloyd A. Gall
*Attorney, Agent, or Firm*—Dressler, Goldsmith, Shore & Milnamow, Ltd.

[57] ABSTRACT

A lock includes a plurality of rod-shaped elements which are connected at their ends by pivots, which lock is closable into a loop by a security lock. The pivots include movable parts which are housed within a protective casing. Each rod-shaped element is rotatable about its longitudinal axis relative to the casings.

6 Claims, 4 Drawing Sheets

LOCK WITH ROD-SHAPED ELEMENTS

The present invention relates to a lock for securing objects, in particular cycles, against theft, comprising a plurality of rod-shaped elements connected with their ends by means of pivot means to form a chain which is closable into a loop by means of a security lock.

Such a lock is for example known from U.S. Pat. No. 4,760,718. This lock positively differs from conventional bracket, chain, or cable locks due to a good resistance against forcing as a result of the hardened steel rods and due to the user friendliness and in particular due to the collapsibility enabling the lock to be easily transported in or on the vehicle when it is out of use.

Older examples of locks having pivotable rod-shaped elements are disclosed in German patent 409,524, German patent 1,008,599 and U.S. Pat. Nos. 3,747,376 and 3,908,414. It will be clear that the locks shown therein do not comply with the strict requirements demanded of the locks nowadays.

WO 90/12182 discloses a lock according to the preamble of claim 1. This lock as shown in the embodiment of FIG. 6–9 is made of a number of hollow links interlocked by rod-shaped elements which are enclosed by said links. The engagement of the rod-shaped elements and the hollow links is such that the elongate assembly formed by the links can adopt a certain angular deflection in relation to each other so that they form a loop.

The object of the present invention is to further improve the prior art lock, in particular with respect to the cracking resistance.

For this purpose the invention proposes a lock which is characterized in that the rod-shaped elements project out of the casings along the main portion of their length and are housed with their ends within said spaced apart casings, the casings allowing a relative pivoting movement of all adjacent rods of at least substantially 180°, when the lock is in closed condition.

Because according to the invention the rod-shaped elements are not only pivotable about perpendicular axes, but are also permitted to rotate about their own longitudinal axis, a very freely movable assembly is created in which the pivot means may also move in a direction of their pivot axis. This great freedom of movement hinders the sawing operation and renders it impossible to exert a large torque onto the lock one way or another in order to force it. Furthermore, it is also impossible to break the lock by fixing a very large pipe wrench or the like onto one of the rod-shaped elements to wrench it then about the longitudinal axis because the rod-shaped element just moves with it.

It is noted that a lock having a rod that is rotatable about the longitudinal axis is known per se from the PCT application No. WO 83/04009, but the advantageous great freedom of movement of the lock is in no way suggested by this document since there is only one rod seating with its ends in holders fixed to the bicycle.

According to the invention, the pivot means are protected from cracking because each pivot means is formed by a first pivot part having a cylindrical cavity and a second pivot part having a cylindrical projection fitting in it, a latching means retaining both pivot parts in the direction of the pivot axis.

The invention will hereafter be further explained with reference to the drawings schematically showing embodiments of the invention by way of example.

In the various figures like parts are indicated with like reference numerals.

Figure 1:
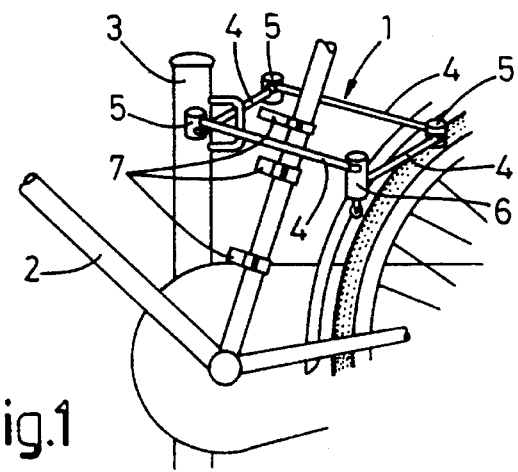
FIG. 1 is a perspective view of a part of a bicycle including the exemplary embodiment of the lock according to the invention.
Figure 2:
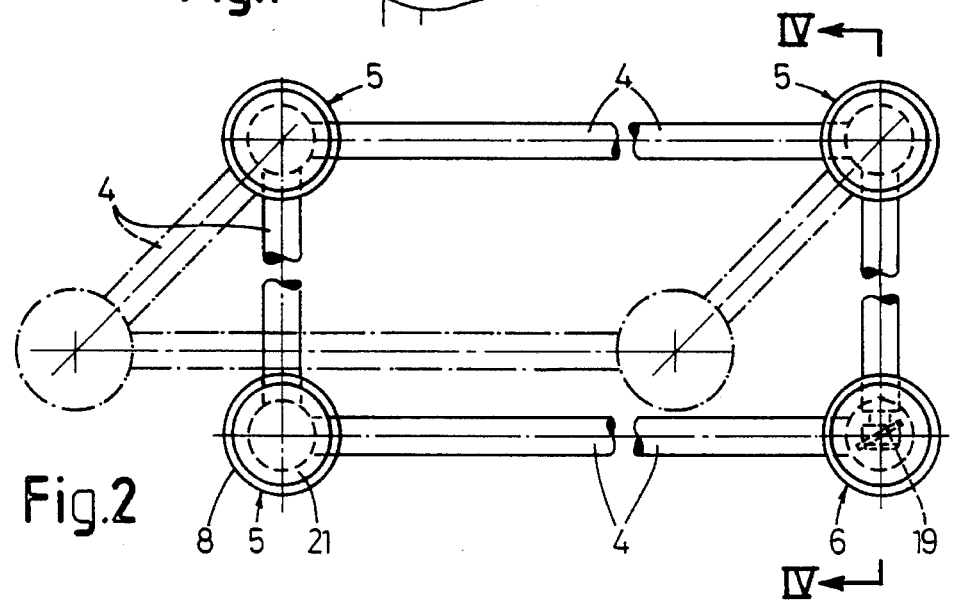
FIG. 2 is an enlarged plan view of the lock of FIG. 1.

FIG. 1–5 show a first embodiment of a lock 1 according to the invention which is particularly intended to secure a bicycle 2 against theft, a portion of said bicycle being schematically indicated in FIG. 1. In this case, the lock 1 is arranged around a frame part of the bicycle 2 and a stationary object, such as the post 3. Of course, the bicycle 2 may also be locked in various other ways. It should also be contemplated that the lock can also be constructed to secure other objects from theft, such as motor cycles, mopeds, outboard motors and all kinds of other theft-susceptible articles through which or about which the lock 1 may be irremovably installed.

From Fig. I and 2 it is clear that the lock 1 is equipped with a plurality of, in this case four, rod-shaped elements or rods 4 of which the ends are interconnected by pivots 5 to form a chain of which the free ends can be connected to form a closed loop by means of a security lock 6 which is also constructed as a pivot. In this case the four rods 4 form a deformable parallelogram, but by increasing the number of rods any deformable polygon can be formed.

Figure 3:
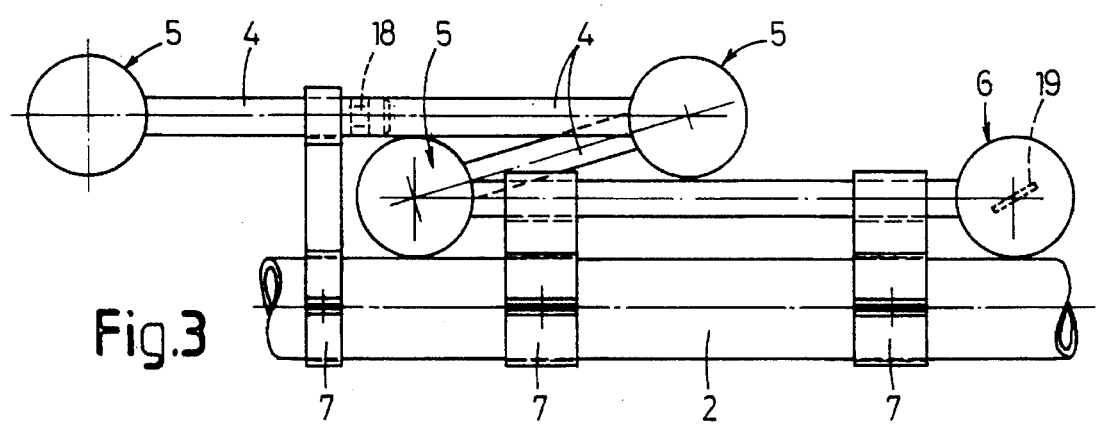
FIG. 3 is a view of the lock corresponding to that of FIG. 2 when it is in its non-use position fixed to a frame tube of the bicycle of FIG. 1.

FIG. 3 shows the position of the lock 1 in which it is out of use and mounted to one of the frame tubes of the bicycle 2 by means of three bracket clamps 7. In this collapsed position of the lock 1, the safety lock 6 is opened and the rods 4 of the lock 1 are folded such that the lock, in its entirety, is lying closely adjacent the frame tube of the bicycle 2 and the appearance of the bicycle is hence hardly disturbed. The pivots 5 of the lock 1 should of course be such that they permit the illustrated rotations of the rods 4 to collapse the lock 1. This will be further explained later on.

Figure 4:
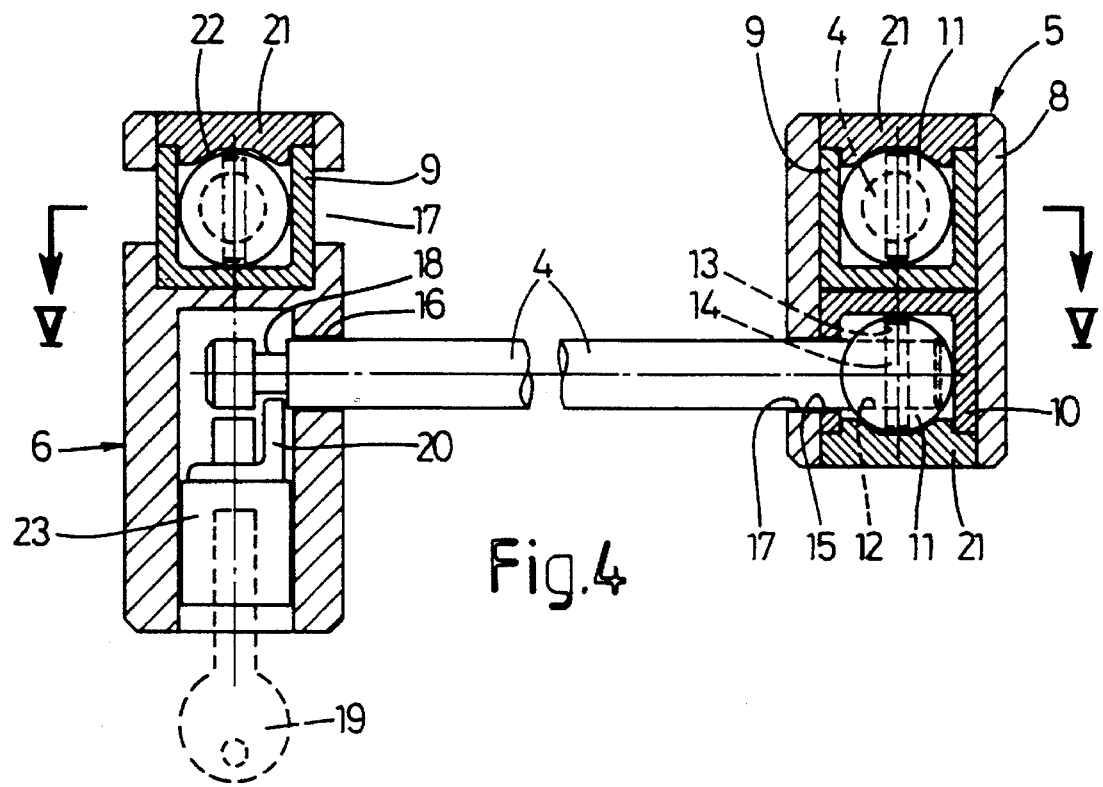
FIG. 4 is a further enlarged sectional view along the line IV—IV of FIG. 2.
Figure 5:
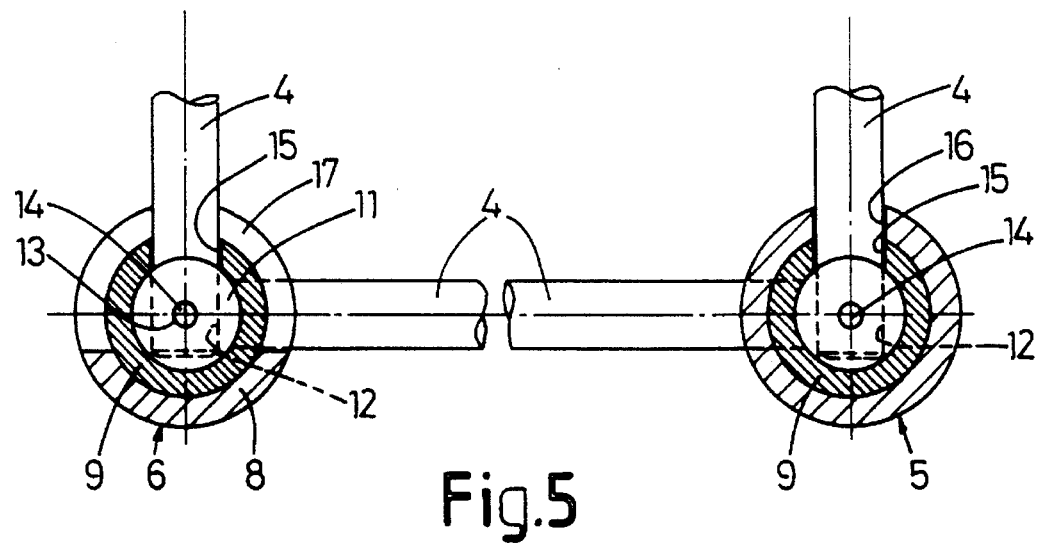
FIG. 5 is a sectional view along the line V—V of Fig. 4.

FIG. 4 shows on a larger scale the structure of the pivots 5 and the safety lock 6, respectively. There it can be seen that each pivot 5 comprises a very solid outer casing which is formed by an outer sleeve 8 in which the proper pivot is housed. As a result, the pivot is very well protected from damage or destruction. Within the outer sleeve 8 there are two loosely fitted inner sleeves 9, 10 closed at one end and abutting each other with their closed ends. Each inner sleeve 9, 10 is intended to movably receive therein a ball 11 configured at the ends of each rod 4. The ball can be integrally formed with the rod 4 or may be welded thereto, for example, but in the case shown each ball 11 includes a bore 12 in which the end of the respective rod 4 engages while a hole 13 bored in the ball 11 and the rod 4 perpendicular to this bore 12 is permitted to receive a davel pin to interconnect the rod 4 and the respective ball 11. This embodiment has advantages as to its assembly because the rod 4 may simply be fastened to the ball 11 when it is already within the inner sleeve 9 or 10 and the outer sleeve 8. The inner sleeve 9, 10 should only have one passage opening 15 in its circumferential wall to allow the passage of the rod 4, and the outer sleeve 8 has a passage opening 16 or a circumferential pivot slot 17. A mounting slot extending to the end of the sleeves 8–10 is not necessary then.

Due to the pivot slot 17 already mentioned, at least one of the adjacent rods 4 is allowed to rotate relative to the respective outer sleeve 8 of the pivot 5 and consequently relative to the other rod of said pivot so that a sufficient pivot action between the rods 4 is guaranteed. Of course it is also possible that both adjacent rods 4 project through the outer sleeve 8 by means of a pivot slot allowing a greater pivot angle. This is for example realized in the central pivot 5 which should allow an angular rotation of both rods 4 through more than 180° if the lock 1 is folded to the position of FIG. 3. The central pivot 5 may for example comprise a pivot slot 17 of 180° and a pivot slot of slightly more than 180°, for example 220° while both other pivots 5 and also the safety lock 6 constructed as pivots may comprise a single slot of 180°. Both pivot slots 17 of the central pivot 5 may be arranged in different heights in the outer sleeve 8 because the respective adjacent rods 4 also extend in different planes. Both opposite rods 4 are within the same plane in the closed position of the lock 1 according to FIG. 1.

Due to the special connection between the rods 4 and the various pivots 5 or the safety lock 6, respectively, by means of the balls 11, the rods 4 are freely rotatable about their longitudinal axis so that tools get little grip on the rods 4 in order to destruct the lock.

The rotatability of the rod 4 cooperating with a locking means of the safety lock 6 is also guaranteed in that the rod 4, shown in FIG. 4, has a circumferential groove 18 therein allowing the engagement of a locking nose 20 rotatable by a key 19 of a cylinder lock 23 for preventing the withdrawal of the rod from the sleeve of the security lock 6 but for permitting a rotation of the rod 4 about its longitudinal axis.

The outer sleeves 8 are closed at the opposite open ends by covers 21 which may be pressed either in the respective inner sleeve 9, 10 or in the outer sleeve 8 for confining the ends of the rods 4 within the casing formed by the outer sleeve 8 in a reliable and undetachable manner. The ball 11 in the lower inner sleeve 10 cannot be reached through the pivot slot 17 in the outer sleeve 8 because this ball 11 is confined within the rotatable inner sleeve 10. Also the respective cover 21 cannot be reached through the pivot slot 17. The covers 21 may also include on their inner side a bowl-shape 22 for the respective ball 11. Instead of or in addition to the press fitting of the covers 21 they may also be fixed by other fastening means or methods to the inner or outer sleeve 8, 9, 10. One can think of locking pins or welded connections.

Figure 8:
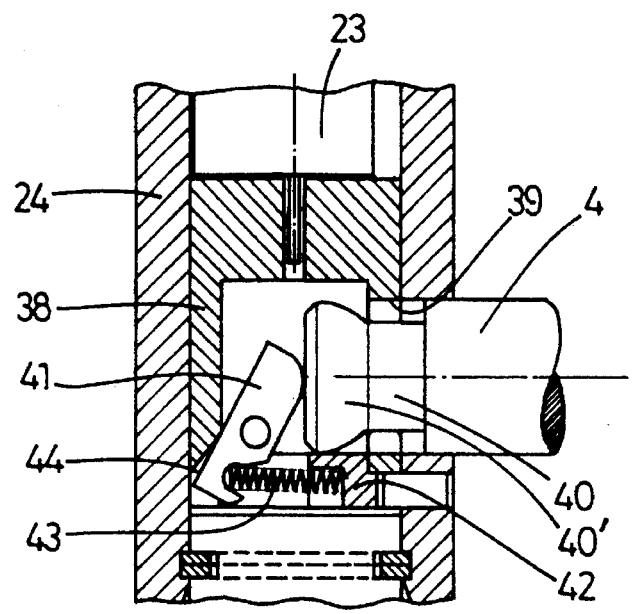
FIG. 8 shows a portion of FIG. 7 in which the safety lock, however, is in the open position.
Figure 6:
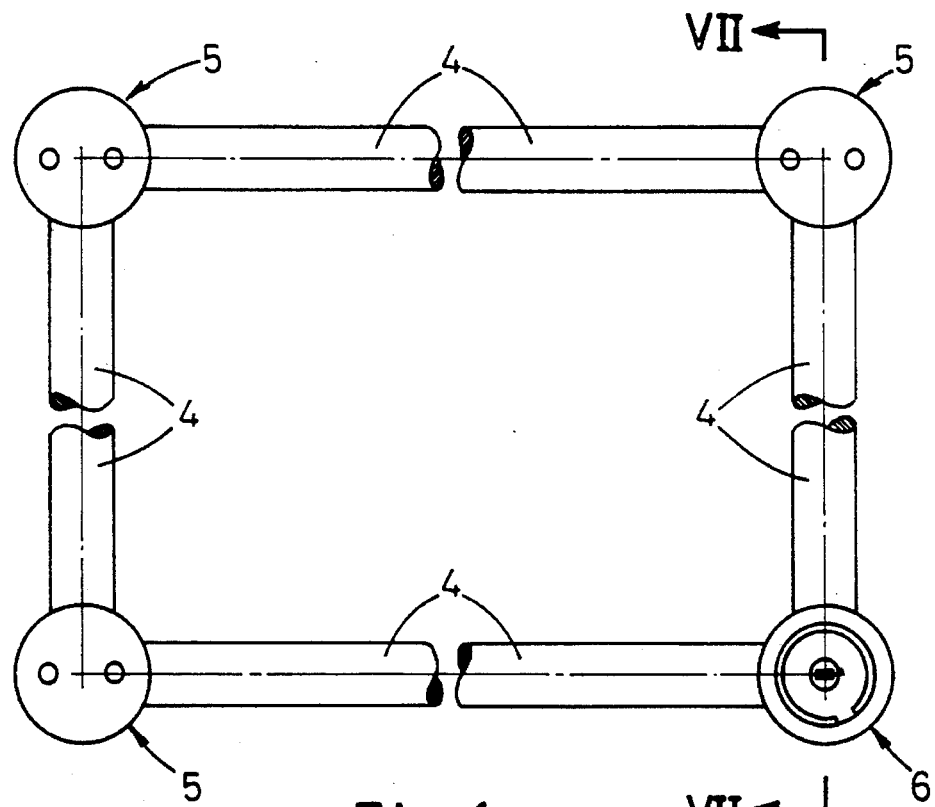
FIG. 6 is a plan view corresponding to that of FIG. 2 illustrating a modified embodiment of the lock according to the invention.
Figure 7:
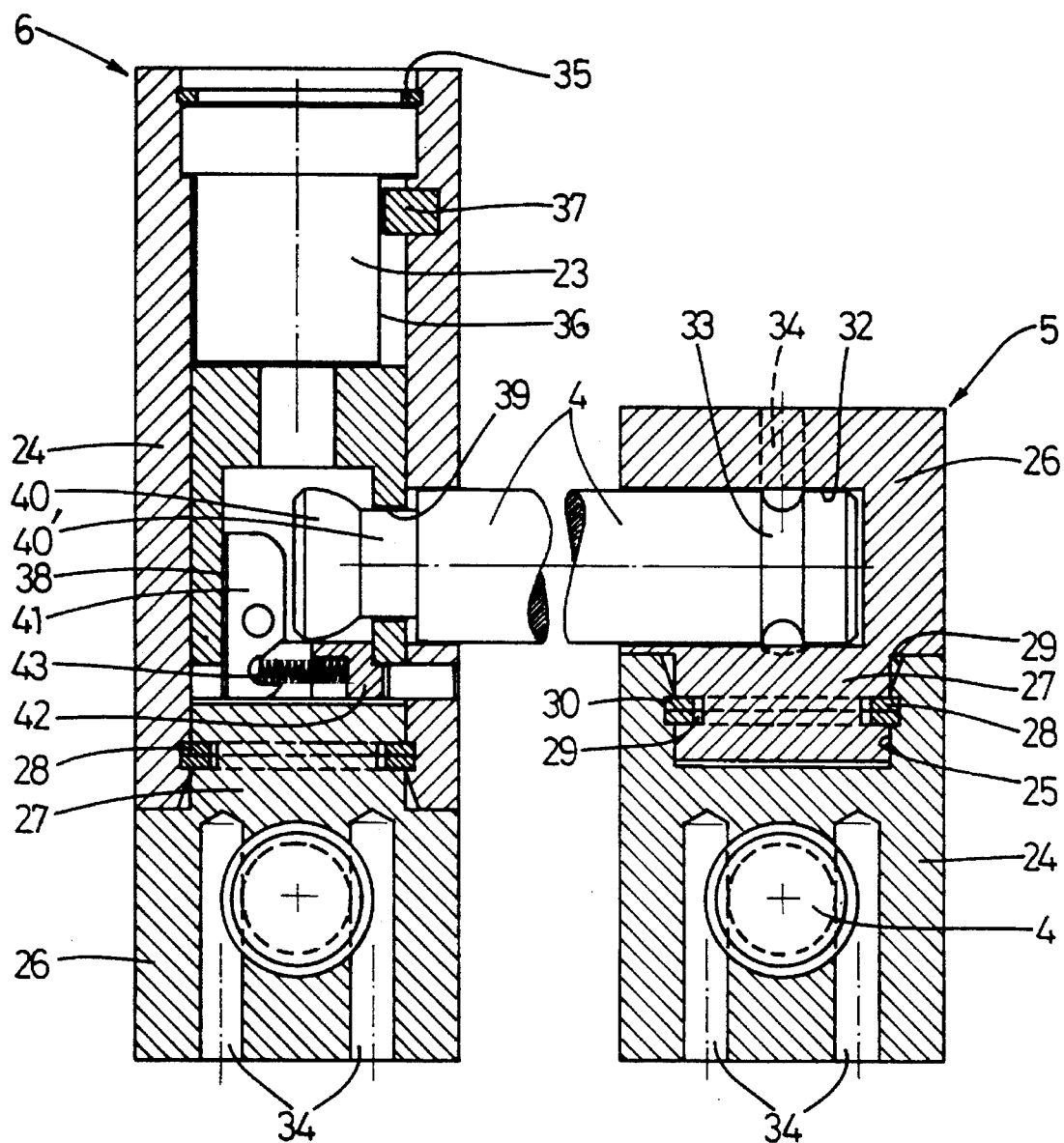
FIG. 7 is an enlarged sectional view along the line VII—VII.

FIG. 6–8 show a second exemplary embodiment of the lock according to the invention, in which particularly the structure of the pivots 5 and the safety lock 6 is modified. FIG. 7 illustrates that the pivot 5 is formed by a first cylindrical pivot part 24 having in a butt end thereof a cylindrical cavity 25, and a second pivot part 26 having on a butt end thereof a cylindrical projection 27. The projection 27 rotatably fits within the cavity 25 so that together they form an inner pivot. In a direction of the pivot axis both pivot parts 24 and 26 are retained by a latching means 28 preventing the projection 27 from being withdrawn from the cavity 25. The latching means 27 consists in this case of a double spring clip fitting into an outer circumferential groove 29 in the projection 27 on the one hand and into an inner circumferential groove 30 in the cavity 25 on the other hand and consequently locks both pivot parts 24 and 26 in axial direction and also supports the pivot action of the projection 27 within the cavity 25. The spring clips 28 consist of an open ring which, prior to the introduction of the projection 27 in the cavity 25, is permitted to be pushed fully into the deep circumferential groove 29 by means of the chamfered edge 31 at the inlet of the cavity 25 and the outwardly resilient spring clips 28 automatically snap into the circumferential groove 30 when they reach this circumferential groove 30 within the cavity 25. Because both pivot parts 24 and 26 abut each other without play it is practically impossible to force the pivot. Furthermore, both pivot parts 24 and 26 are constructed extremely solid.

In this exemplary embodiment, the rods 4 are inserted into cylindrical blind holes formed perpendicular to the pivot axis and are retained therein by means of a circumferential groove 33 spaced from the end of each rod 4 in which a retainer pin is inserted, in this case from the outer butt end of the respective pivot parts 24, 26, preventing the withdrawal of the rods 4 from the blind holes 32 in the pivots 5. Of course the retainer pins 34 could also be introduced from the side of the pivot 5 and also other retainer means could be used.

In the manner shown, the pivot parts 24 and 26 are relatively rotatable more than 360°, while also the rods 4 are received in the pivots 5 in a freely rotatable manner so that the rods 4 and the pivots 5 form a very freely movable assembly which is nonetheless steady.

On the left side of FIG. 7 there is shown the safety lock 6. The cylinder lock 23 thereof is mounted within the first pivot part 24, which is sleeve-shaped in this case, with a tight fit and it is also protected by a spring clip 35. A flattened side 36 of the cylinder lock and a half-moon disc 37 in the first pivot part 24 ensure a proper angular position of the cylinder lock 23. The cylinder lock 23 actuates a locking sleeve 38 comprising a slot 39 extending through a part of the circumference and having an enlarged height at one end in order to permit the introduction of the head 40 at the end of the respective rod 4, and said slot further having such a small height that the circumferential slot 39 just fits around the circumferential groove 40' of the rod 4 so that the rod is secured against withdrawal.

The safety lock 6 is further equipped with a mechanism ensuring that the key (not shown) can only be pulled out in the closed position of the lock. For this purpose, a catch 41 bears on a plate 42 under the latching sleeve 38 and being loaded with its lower part outwardly by a compression spring 43. In the open position of the lock as shown in FIG. 8, a recess 44 on the inner side of the latching sleeve 38 is aligned with the lower part of the catch 41 so that the spring 43 is permitted to urge it into the recess 44 and thereby locking the latching sleeve 38 against rotation. Only if the rod 4 is pushed into the safety lock 6, the catch 41 is moved out of the recess 44 against the pressure of the spring 43 and if the key is then rotated to the fully closed position of the safety lock 6, it can be pulled out of the lock in a manner not shown. A rotation of the key from the open to the closed position of the safety lock 6 is not possible without the rod 4 moving the catch 41 from its locked position.

From the foregoing it will be clear that the invention provides a lock for securing objects, in particular cycles, against theft which is very force resistant. Since the rods 4 do not have to be bent they can be made of very hard steel which is resistant against cutting or sawing and which is hard to grind. The free-rotatability of the rods about their longitudinal axis hinders the grip of a tool on the rods 4. As a result of the full pivotability of the rods with respect to each other, whereby the rectangular configuration of the rods 4 shown in FIG. 2 with continuous lines, may be deformed to a parallelogram indicated by dot and dash lines, the lock yields when a force is exerted thereon so that it is further complicated to force the lock 1. The pivots between the rods 4 are very well protected by a single casing made of hardened steel or another material, so that also the pivots cannot be destructed. The lock 1 can also be collapsed to a small size so that the lock can simply be hanged or put away somewhere.

The invention is not restricted to the embodiments shown in the drawing and described herein but may be varied in different manners within the scope of the invention. The lock may for example also be provided with six or more rods. A very favorable alternative embodiment is that in which the lock is permanently fixed to the bicycle, for example to the luggage carrier thereof. In this case a ball pivot may be mounted to a rod which is fastened to a slide which is slidable along the luggage carrier and which also serves as a holder for suspending the lock from the luggage carrier. For use, the lock should only be unfolded, inserted through the wheel and finally be folded around a fixed obstacle in order to be finally closed. This creates a user friendly assembly wherein it takes little time and effort to put the lock away and to lock the bicycle, while the lock may also be used as the standard lock mounted by the manufacturer. It is further noted that the inner pivot disclosed herein may also be used in a rod lock of which the rods are not rotatable about their longitudinal axis. Also the safety lock according to the invention may be used in other types of locks.

We claim:

1. Lock (1) for securing objects, in particular cycles, against theft, comprising a plurality of rod-shaped elements (4) connected with their ends by means of pivot means (5) to form a chain which is closable into a loop by means of a security lock (6), the pivot means (5) having movable parts (9, 10, 11; 25, 27) each housed within a protective casing (8; 24, 26), the ends of each rod-shaped element (4) being constructed as a bearing for permitting a rotation of each rod-shaped element (4) about its longitudinal axis relative to the casings (8), characterized in that the rod-shaped elements (4) project out of the casings (8; 24, 26) along the main portion of their length and are housed with their ends within said casings, the casings (8; 24, 26) allowing a relative pivoting movement of all adjacent rods (4) of at least substantially 180°, when the lock is (1) in closed condition.

2. Lock according to claim 1, wherein the ends of the rod-shaped elements (4) serving as bearings comprise a circumferential groove (32) into which there projects a retaining means (34) fixed within the casing (24, 26).

3. Lock according to claim 1, wherein each pivot means (5) is formed by a first pivot part (24) having a cylindrical cavity (25) and a second pivot part (26) having a cylindrical projection (27) fitting in said cavity, a latching means (28) retaining both pivot parts (24, 26) together in the direction of a pivot axis.

4. Lock according to claim 3, wherein the latching means (28) includes a spring clip projecting into coaxial circumferential grooves (29, 30) in the projection (27) and the cavity (25) of both pivot parts (24, 26).

5. Lock according to claim 1, wherein the security lock (6) is constructed such that a key (19) thereof can only be taken out in the closed condition of the lock (1).

6. Lock according to claim 5, wherein the security lock (6) is provided with a movable spring catch (41) locking a rotating sleeve (38) in an open position of the lock (1), and which catch (41) is unlocked by an end of a respective rod-shaped element (4) when it is inserted into the security lock.

\* \* \* \* \*